(12) United States Patent
Gaudet et al.

(10) Patent No.: US 6,543,010 B1
(45) Date of Patent: Apr. 1, 2003

(54) METHOD AND APPARATUS FOR ACCELERATING A MEMORY DUMP

(75) Inventors: Rene Gaudet, Cypress, TX (US); John Lacombe, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/256,542

(22) Filed: Feb. 24, 1999

(51) Int. Cl.[7] .................................................. G06F 11/00
(52) U.S. Cl. ........................................... 714/45; 714/24
(58) Field of Search ............................. 714/42, 49, 54, 714/15, 20, 24, 37, 45

(56) References Cited

U.S. PATENT DOCUMENTS

| | | | | |
|---|---|---|---|---|
| 5,111,384 A | * | 5/1992 | Aslanian | 714/26 |
| 5,335,341 A | * | 8/1994 | Chana | 714/37 |
| 5,860,115 A | * | 1/1999 | Neuhard | 711/147 |
| 5,864,661 A | * | 1/1999 | Ohara | 714/42 |
| 5,999,933 A | * | 12/1999 | Mehta | 707/100 |
| 6,158,025 A | * | 12/2000 | Brisse | 714/48 |
| 6,182,243 B1 | * | 1/2001 | Berthe | 714/38 |
| 6,202,174 B1 | * | 3/2001 | Lee | 714/38 |

FOREIGN PATENT DOCUMENTS

| | | | |
|---|---|---|---|
| JP | 2-242447 | * | 3/1989 |
| JP | 3-156547 | * | 11/1989 |
| JP | 3-252749 | * | 3/1990 |
| JP | [1989]- 62316 | | 9/1990 |

OTHER PUBLICATIONS

"data compression" www.techweb.com.*
"Huffman Coding" www.mathworld.wolfram.com.*
"data compression" Encyclopedia Britannica*
Dictionary Methods, www.rasip.fer.hr/research/compression/algorithms/index.html.*
"How File Compression Works" www.howstuffworks.com/file–compression.htm.*

* cited by examiner

Primary Examiner—Scott Baderman
Assistant Examiner—Bryce P. Bonzo
(74) Attorney, Agent, or Firm—Conley Rose, P.C.

(57) ABSTRACT

A computer system includes a microprocessor, a storage device, and a system memory. The storage device is accessible by the microprocessor. The system memory is accessible by the microprocessor and adapted to store data. The data includes operating system software. The operating system software, when executed by the microprocessor, is adapted to detect an error condition, and in response to the error condition, read at least a portion of the data stored in the system memory, compress the portion to generate compressed data, and store the compressed data on the storage device. A method for responding to an unrecoverable error in a computer system includes identifying the unrecoverable error and reading at least a first portion of the data stored in a memory device of the computer system. The first portion is compressed to generate compressed data, and the compressed data is stored on a storage device of the computer system.

18 Claims, 4 Drawing Sheets

US 6,543,010 B1

METHOD AND APPARATUS FOR ACCELERATING A MEMORY DUMP

BACKGROUND OF THE INVENTION

1. Field of the Invention

This invention relates generally to computer systems, and, more particularly, to a method and apparatus for accelerating a memory dump generated in response to an operating system failure.

2. Description of the Related Art

Computer systems, such as servers, have been equipped with error recovery mechanisms to diagnose system problems that have resulted in system failure or fault. One such recovery mechanism involves writing the contents of the system memory to a disk file upon identification of a non-recoverable fault. Prior to halting the system, the operating system writes the contents of the system memory to a disk file. The disk file may then be analyzed after the server has been rebooted to identify potential causes for the error condition.

Some servers are equipped with relatively large amounts of system memory. The time required to dump the memory contents to the disk file is significant. For example, the time required to perform a memory dump for a system equipped with 3.5 GB of memory may exceed 20 minutes. During the time the memory dump is being performed, the server is unavailable. This may be a severe disadvantage in a high availability server environment where uptime is critical.

The present invention is directed to overcoming, or at least reducing the effects of, one or more of the problems set forth above.

SUMMARY OF THE INVENTION

One aspect of the present invention is seen in a computer system including a microprocessor, a storage device, and a system memory. The storage device is accessible by the microprocessor. The system memory is accessible by the microprocessor and adapted to store data. The data includes operating system software. The operating system software, when executed by the microprocessor, is adapted to detect an error condition, and in response to the error condition, read at least a portion of the data stored in the system memory, compress the portion to generate compressed data, and store the compressed data on the storage device.

Another aspect of the present invention is seen in a method for responding to an unrecoverable error in a computer system. The method includes identifying the unrecoverable error and reading at least a first portion of the data stored in a memory device of the computer system. The first portion is compressed to generate compressed data, and the compressed data is stored on a storage device of the computer system.

BRIEF DESCRIPTION OF THE DRAWINGS

The invention may be best understood by reference to the following description taken in conjunction with the accompanying drawings, in which like reference numerals identify like elements, and in which.

Figure 1:
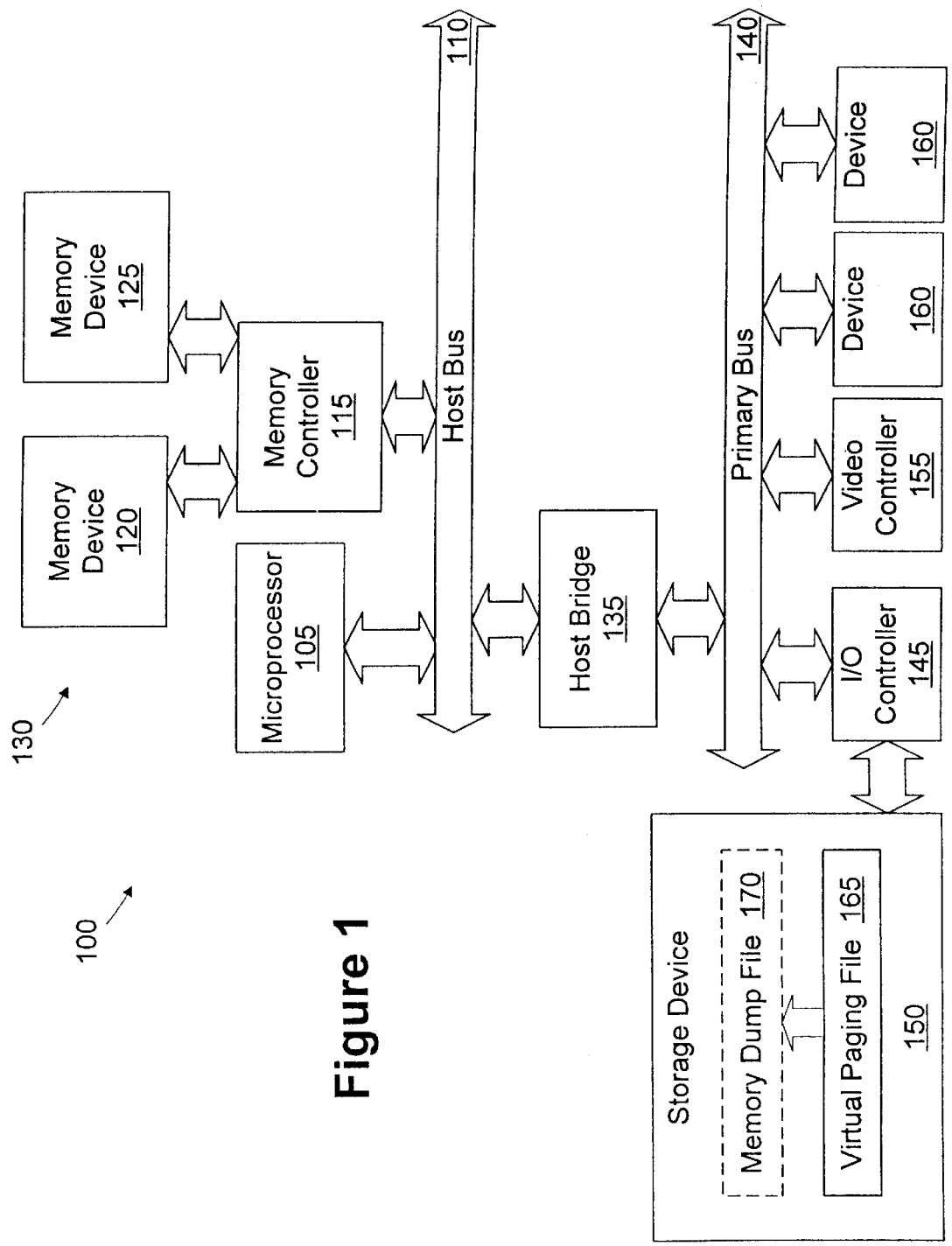
FIG. 1 is a block diagram of a computer system in accordance with the present invention.

While the invention is susceptible to various modifications and alternative forms, specific embodiments thereof have been shown byway of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer system 100, is provided. The computer system 100 includes a microprocessor 105, which may include multiple processors (not shown), coupled to a host bus 110. A memory controller 115 is coupled to the host bus 110 and memory devices 120, 125. The microprocessor 105 communicates with the memory devices 120, 125 through the memory controller 115. Collectively, the memory devices 120, 125 form a system memory 130 accessible by the computer system 100. A host bridge 135 couples the host bus 110 to a primary bus 140, such as a peripheral component interconnect (PCI) bus (PCI Specification, Rev. 2.1). An I/O controller 145 is coupled to the primary bus 140 for communicating with a storage device 150, such as a hard disk drive. The I/O controller 145 may be an EIDE/IDE controller, a SCSI controller, or some other type of controller for interfacing with the storage device 150. A video controller 155 and other devices 160 (e.g., PCI devices) are coupled to the primary bus 140. The computer system 100 may include other buses such as a secondary PCI bus (not shown) or other peripheral devices (not shown) known in the art.

In the illustrated embodiment, the computer system 100 functions as a server. Due to the large demands commonly placed on a server, the computer system 100 includes a relatively large quantity of system memory 130. For example, the system memory 130 may include around 4.5 GB of random access memory (RAM) in some applications. Although two memory devices 120, 125 are shown, it is contemplated that any number of memory devices 120, 125 may be included.

Figure 2:
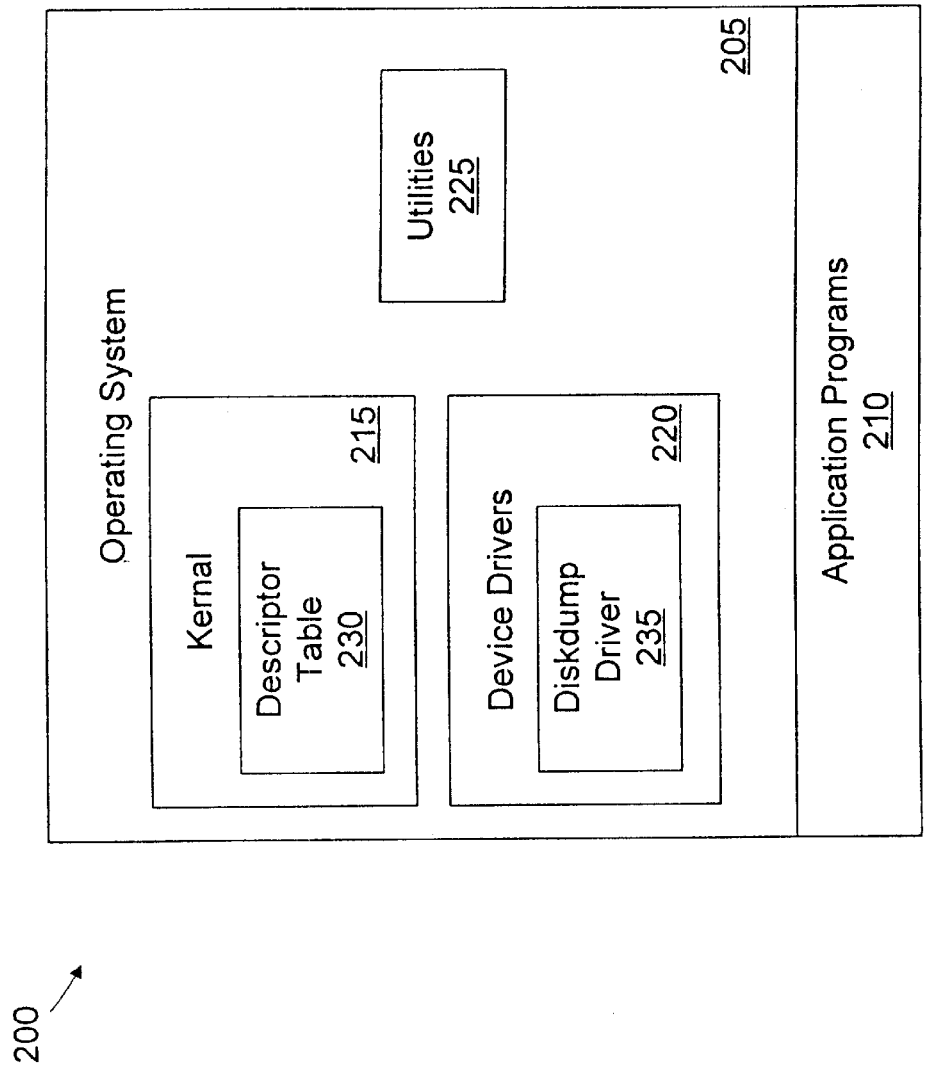
FIG. 2 is a diagram illustrating software applications executed by the computer system of FIG. 1.

Referring to FIG. 2, a stylized diagram illustrating software applications 200 executed by the computer system 10 is provided. Typically, at least portions of the software applications 200 are stored in the system memory 130 while being executed by the microprocessor 105. The computer system 100 operates under the control of an operating system 205. Under the direction of the operating system 205, the computer system 100 executes one or more application programs 210. The operating system 205 allocates resources of the computer system 100, such as the system memory 130, to the application programs 210.

The operating system 205 includes a kernal 215, device drivers 220, utilities 225, and other software elements (not shown) useful for general control of the computer system 100. The kernal 215 performs, among other things, memory management, application program loading, task management, function invocation, input/output (I/O) management, and other related functions. The device drivers 220 perform standard functions known in the art for interfacing with elements of the computer system 100, and the utilities 225 perform functions known in the art, such as linking and task switching notification. In the illustrated embodiment, the operating system 205 may be a multitasking operating system, such as Windows® NT sold by Microsoft Corporation.

As is well known in the art, the system memory 130 may be divided into segments and addressed using logical or physical addresses. The kernal 215 includes a descriptor table 230 for managing and protecting memory. As known to those of ordinary skill in the art, the descriptor table 230 may include a global descriptor table (not shown), a local descriptor table (not shown), or both. Information in the descriptor table 230 defines the partitioning of the system memory 130 into segments. Typically, the descriptor table 230 includes a segment base address and a segment limit for each partitioned segment. Address translation circuitry (not shown) in the microprocessor 105 uses the segment base address, the segment limit, and an offset to translate a logical address into a corresponding physical address for accessing the system memory 130.

The device drivers 220 include a diskdump driver 235 for transferring the contents of the system memory 130 to the storage device 150 in the event of an unrecoverable error being encountered by the operating system 205. Specific unrecoverable errors are known to those of ordinary skill in the art, and are not discussed in greater detail herein.

In response to an unrecoverable error, the kernal 215 accesses the diskdump driver 235 to transfer the contents of the system memory 130 to a virtual paging file 165 (e.g., pagefile.sys) on the storage device 150 prior to shutting down. After the computer system 100 is reinitialized, or rebooted, the virtual paging file 165 is renamed to a memory dump file 170 (e.g., memory.dmp). The memory dump file 170 may be analyzed by various tools known in the art to aid in determining the cause of the failure in the operating system 205.

Figure 3:
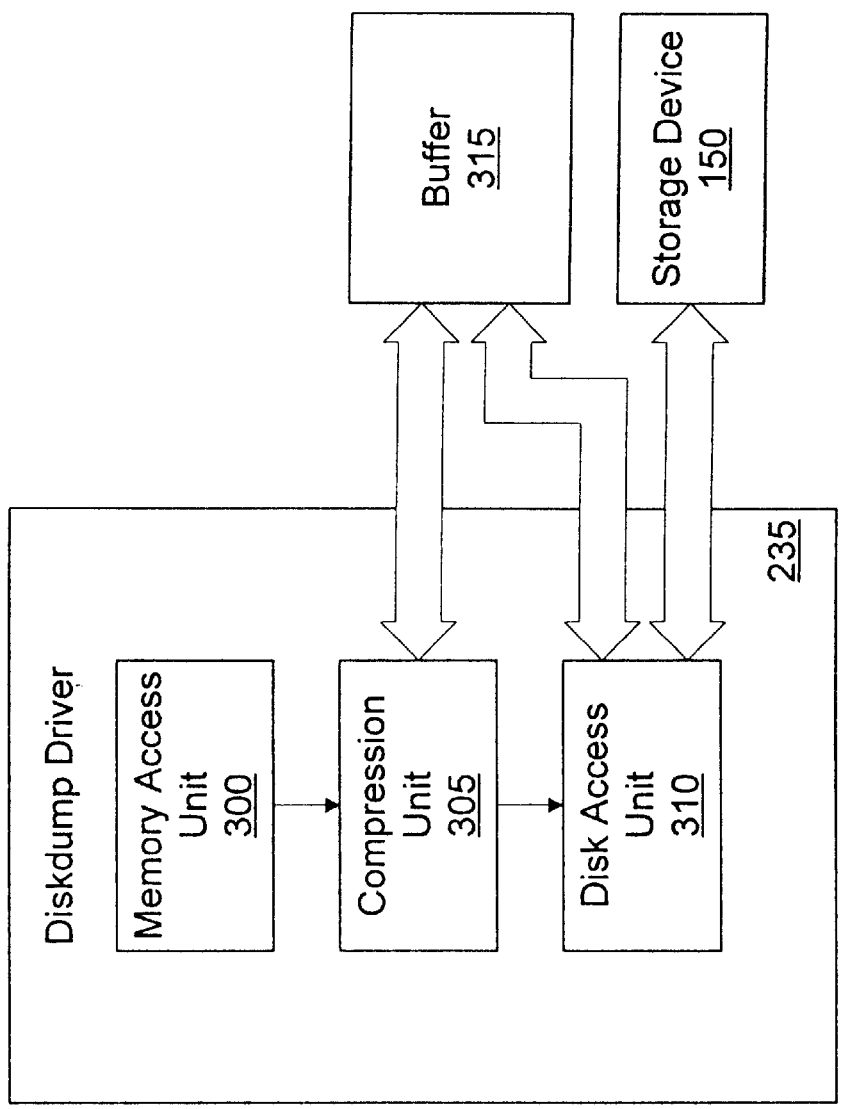
FIG. 3 is a functional block diagram of a diskdump driver of FIG. 2 interfacing with a buffer and a storage device.

FIG. 3 is a block diagram of the diskdump driver 235. As used hereinafter, the term "unit" refers to a group of program instructions in the diskdump driver 235 that, when executed by the microprocessor 105 under the control of the kernal 215, perform the functions described. Alternatively, the functions may be performed by dedicated hardware. The diskdump driver 235 includes a memory access unit 300, a compression unit 305, and a disk access unit 310. The diskdump driver 235 interfaces with the storage device 150 to write data to the virtual paging file 165. A buffer 315 is defined in the system memory 130 for use during the compression performed by the compression unit 305. Alternatively, it is contemplated that the buffer 315 may be located on a memory device (not shown) separate from the system memory 130. The memory access unit 300 accesses the segments defined in the system memory 130 through the kernal 215 based on the descriptor table 230. The buffer 315 is defined in a portion of the system memory 130 that is not allocated in the descriptor table 230.

The compression unit 305 receives data stored in the system memory 130 from the memory access unit 300, compresses the data, and sends the compressed data to a disk access unit 310. The disk access unit 310 writes the compressed data to the virtual paging file 165 on the storage device 150.

The specific compression algorithm used by the operating system 205 depends on the particular application. Many compression algorithms are known in the art. The compression algorithm employed should be lossless to preserve the integrity of the data. Some lossless compression programs compress a data stream as it is being sent (e.g., data being sent through a modem is often compressed in this manner). Other compression programs analyze a set of data to identify repeating data strings. Each repeating data string is assigned a code that represents the data string. A dictionary is used to keep track of the repeating strings and their assigned codes. The compressed data consists of the dictionary and the symbols. Certain data strings may not repeat sufficiently to warrant assigning them a code, and are therefore stored uncompressed.

The specific compression algorithm chosen for compressing the data in the system memory 130 depends on factors such as storage overhead (e.g., algorithm and dictionary storage requirements), processing overhead (e.g., compression factor vs. algorithm speed), and data type considerations (i.e., different types of data are compressed with different efficiencies). Commonly available compression programs, such as PKZIP®, sold by PKWARE, Inc. of Brown Deer, Wis., have average compression ratios of about 0.5. In the illustrated embodiment, a Lempel-Ziv (LZ77) compression algorithm is used.

Figure 5A:
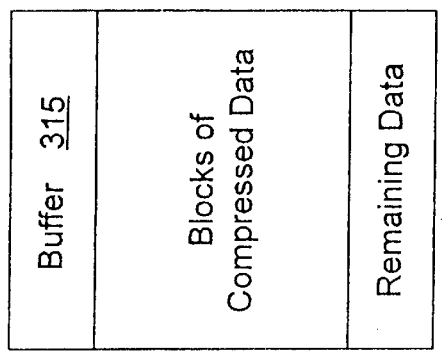
FIGS. 5A and 5B illustrate the contents of the buffer of FIG. 3 during the compression performed by the diskdump driver.
Figure 5B:
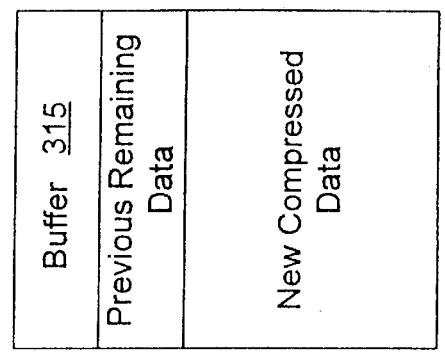
Figure 4:
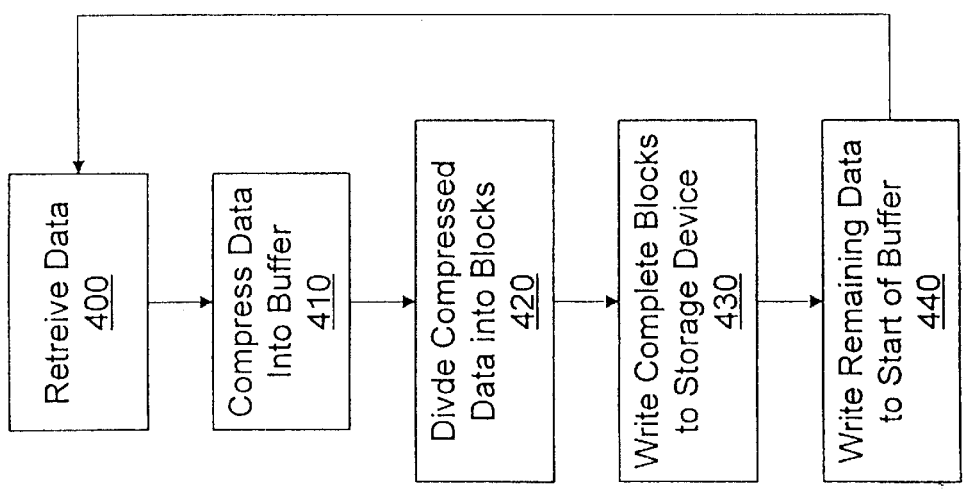
FIG. 4 is a flow chart illustrating the operation of the disk dump driver of FIG. 3.

Turning now to FIG. 4, a flow chart illustrating the operation of the diskdump driver 235 is provided. In block 400, data is retrieved from the system memory 130 by the memory access unit 300 based on the descriptor table 230. The data is compressed by the compression unit 305 in block 410 and stored in the buffer 315. The compressed data is divided into blocks in block 420. In the illustrated embodiment, the storage device 150 is a SCSI hard disk drive. In accordance with the SCSI standard, data is written in blocks of 512 bytes. FIG. 5A illustrates the partitioning of the buffer 315 at this point. Complete blocks of compressed data are written to the storage device by the disk access unit 310 in block 430, and the remaining data is moved to the start of the buffer in block 440 as seen in FIG. 5B. The process is repeated by retrieving additional data in block 400 until the contents of the system memory 130 have been transferred to the storage device 150. On subsequent cycles, the remaining data is combined with new compressed data in the buffer, as shown in FIG. 5B. The selection of block size is application dependent, and may vary.

After the computer system 100 is rebooted, the memory dump file 170 may be decompressed by an application program (not shown) used to analyze the memory dump data, or the memory dump file 170 may be decompressed transparently by the operating system 105 in the background.

As described herein, the data is compressed in the diskdump driver 235, however, it is contemplated that the data compression may occur at a different point in the memory dump process. For example, the data compression function may be included in the I/O management functionality of the kernal 215.

Because the data is compressed before being written to the virtual paging file 165, the time required to complete the transfer of the contents of the system memory 130 to the storage device 150 is greatly reduced. The time required to execute the compression algorithm is small compared to the time to complete a write to the storage device 150. As a result much of the compression gain is directly converted to access time reduction. For example, if the compression unit 305 were to compress the data with a compression ratio of 0.5, the transfer from the system memory 130 to the storage device 150 could be completed in half the time as compared to an uncompressed memory dump. The significance of the time reduction increases as the size of the system memory 130 increases. Completing the memory dump in a shorter period of time reduces the down time of the computer system 100 following a fault condition.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
   a microprocessor;
   a storage device accessible by the microprocessor; and
   a system memory accessible by the microprocessor and adapted to store data, the data including operating system software, wherein the operating system software, when executed by the microprocessor, is adapted to detect an error condition, and in response to the error condition, read only a portion of the data stored in the system memory, compress the portion to generate compressed data, and store the compressed data on the storage device.

2. The computer system of claim 1, wherein the operating system software includes:
   a kernal adapted to divide the system memory into a plurality of segments; and
   a table adapted to store information identifying the segments.

3. The computer system of claim 2, wherein the kernal is adapted to read the portion of the data stored in the system memory based on the table, compress the portion to generate the compressed data, and store the compressed data on the storage device.

4. The computer system of claim 2, wherein the operating system includes a driver adapted to read the portion of the data stored in the system memory based on the table, compress the portion to generate the compressed data, and store the compressed data on the storage device.

5. The computer system of claim 4, further comprising a buffer, wherein the driver is adapted to store the compressed data in the buffer.

6. The computer system of claim 5, wherein the driver is adapted to divide the compressed data into blocks and store at least a portion of the blocks of compressed data on the storage device.

7. A method for responding to an unrecoverable error in a computer system, comprising:
   identifying the unrecoverable error;
   reading only a portion of data stored in a memory device of the computer system;
   compressing the portion to generate compressed data; and
   storing the compressed data on a storage device of the computer system.

8. The method of claim 7, further comprising:
   resetting the computer system to clear the unrecoverable error;
   decompressing the compressed data to recover the portion of the data; and
   presenting the portion of the data for analysis to determine a cause for the unrecoverable error.

9. The method of claim 7, farther comprising:
   partitioning the memory device into a plurality of segments; and
   storing information identifying the segment in a table.

10. The method of claim 7, wherein reading the portion of the data includes reading the portion of the data stored in the system memory based on the table.

11. The method of claim 7, further comprising storing the compressed data in a buffer.

12. The method of claim 11, further comprising dividing the compressed data in the buffer into blocks, and wherein storing the compressed data includes storing at least a portion of the blocks of compressed data.

13. A computer system, comprising:
    a microprocessor;
    a storage device accessible by the microprocessor; and
    a system memory accessible by the microprocessor and adapted to store data, the data including operating system software having a driver, said driver, when executed by the microprocessor, is adapted to detect an error condition, and in response to the error condition, read at least a portion of the data stored in the system memory, compress the portion to generate compressed data, and store the compressed data on the storage device.

14. The computer system of claim 13, wherein the operating system software includes:
    a kernel adapted to divide the system memory into a plurality of segments; and
    a table adapted to store information identifying the segments.

15. The computer system of claim 3, wherein the kernel is adapted to read the portion of the data stored in the system memory based on the table, compress the portion to generate the compressed data, and store the compressed data on the storage device.

16. The computer system of claim 14, wherein the driver is adapted to read the portion of the data stored in the system memory based on the table.

17. The computer system of claim 16, further comprising a buffer, wherein the driver is adapted to store the compressed data in the buffer.

18. The computer system of claim 17, wherein the driver is adapted to divide the compressed data into blocks and store at least a portion of the blocks of compressed data on the storage device.

* * * * *